US007773081B2

(12) United States Patent
Olson

(10) Patent No.: US 7,773,081 B2
(45) Date of Patent: Aug. 10, 2010

(54) METHODS AND APPARATUS FOR EFFICIENTLY OPERATING FLUORESCENT LAMPS

(75) Inventor: Scot Olson, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 613 days.

(21) Appl. No.: 11/432,105

(22) Filed: May 11, 2006

(65) Prior Publication Data

US 2007/0262696 A1 Nov. 15, 2007

(51) Int. Cl.
*G06F 3/038* (2006.01)

(52) U.S. Cl. ........................ 345/212; 313/493; 313/495

(58) Field of Classification Search ................. 313/493; 345/204, 41, 212; 362/260
See application file for complete search history.

(56) References Cited

U.S. PATENT DOCUMENTS 4,959,594 A 9/1990 Ruby
4,998,045 A 3/1991 Ruby
5,027,034 A 6/1991 Ruby et al.
5,101,142 A * 3/1992 Chatfield .................... 315/308
6,118,415 A * 9/2000 Olson .......................... 345/41
6,352,356 B1 * 3/2002 Noll ........................... 362/260
2005/0190167 A1 9/2005 Olson et al.

* cited by examiner

*Primary Examiner*—Nimeshkumar D Patel
*Assistant Examiner*—Mary Ellen Bowman
(74) *Attorney, Agent, or Firm*—Ingrassia Fisher & Lorenz, P.C.

(57) ABSTRACT

Methods and apparatus are provided for improving the efficiency of a fluorescent lamp suitable for use as a backlight in an avionics or other liquid crystal display (LCD). The apparatus includes a channel configured confine a vaporous material that produces an ultra-violet light when electrically excited. A first electrode and a second electrode assembly disposed within the channel and configured to apply an electrical potential across at least a portion of the channel to electrically excite the vaporous material. Control circuitry is configured to provide control signals to the first and second electrodes to apply the electrical potential in a manner that produces a mean electron energy that substantially maximizes probabilities of collisions between electrons and particles that that produce more emissions in the light-producing channel having wavelengths substantially less than 400 nm than emissions having wavelengths greater than 800 nm.

18 Claims, 3 Drawing Sheets

METHODS AND APPARATUS FOR EFFICIENTLY OPERATING FLUORESCENT LAMPS

TECHNICAL FIELD

The present invention generally relates to fluorescent lamps, and more particularly relates to techniques and structures for improving the life and/or efficiency of fluorescent lamps such as those used in liquid crystal displays.

BACKGROUND

A fluorescent lamp is any light source in which a fluorescent material transforms ultraviolet or other energy into visible light. Typically, a fluorescent lamp includes a glass tube that is filled with argon or other inert gas, along with mercury vapor or the like. When an electrical current is provided to the contents of the tube, the resulting arc causes the mercury gas within the tube to emit ultraviolet radiation, which in turn excites phosphors located inside the lamp wall to produce visible light. Fluorescent lamps have provided lighting for numerous home, business and industrial settings for many years.

More recently, fluorescent lamps have been used as backlights in liquid crystal displays such as those used in computer displays, cockpit avionics, night vision (NVIS) applications and the like. Such displays typically include any number of pixels arrayed in front of a relatively flat fluorescent light source. By controlling the light passing from the backlight through each pixel, color or monochrome images can be produced in a manner that is relatively efficient in terms of physical space and electrical power consumption. Despite the widespread adoption of displays and other products that incorporate fluorescent light sources, however, designers continually aspire to improve the amount of light produced by the light source, to extend the life of the light source, and/or to otherwise enhance the performance of the light source, as well as the overall performance of the display. In the NVIS arena, in particular, there is a need to reduce power consumption while also improving the displayed view presented to the user.

Accordingly, it is desirable to provide a fluorescent lamp and associated methods of building and/or operating the lamp that improve the performance of the lamp. Other desirable features and characteristics will become apparent from the subsequent detailed description of the invention and the appended claims, taken in conjunction with the accompanying drawings and this background of the invention.

BRIEF SUMMARY

In various embodiments, methods and apparatus are provided for improving the efficiency of a fluorescent lamp suitable for use as a backlight in an avionics or other liquid crystal display (LCD). An exemplary apparatus includes a channel configured confine a vaporous material that produces an ultraviolet light when electrically excited. A first electrode and a second electrode assembly disposed within the channel and configured to apply an electrical potential across at least a portion of the channel to electrically excite the vaporous material. Control circuitry is configured to provide control signals to the first and second electrodes to apply the electrical potential in a manner that produces a mean electron energy that substantially maximizes probabilities of collisions between electrons and particles that that produce desirable emissions. For example, the electron energy can be configured to produce more emissions in the light-producing channel at wavelengths less than about 400 nm than emissions having wavelengths greater than about 800 nm, or so, although the particular wavelengths emphasized may vary in other embodiments. Additional detail about various exemplary embodiments is set forth below.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Various techniques for improving the efficiency, luminescence and/or other performance aspect of a fluorescent light source are described herein. Each of the various techniques and structures described herein may be independently applied to any and all types of fluorescent light sources, including so-called "aperture lamps", "flat lamps", fluorescent bulbs, and the like.

According to various exemplary embodiments, the fluorescent light source in a display is driven in a manner that emphasizes emissions (e.g. mercury emissions) that stimulate light in the visible spectrum by exciting phosphors, over higher wavelength emissions (e.g. Argon emissions). In night vision (NVIS) applications, in particular, high wavelength emissions can be difficult to filter from the visible display, and in fact can be amplified in some embodiments. Reducing the amount of high-wavelength emissions in a display therefore improves the display presented to the user while conserving energy used to drive the display.

Figure 1:
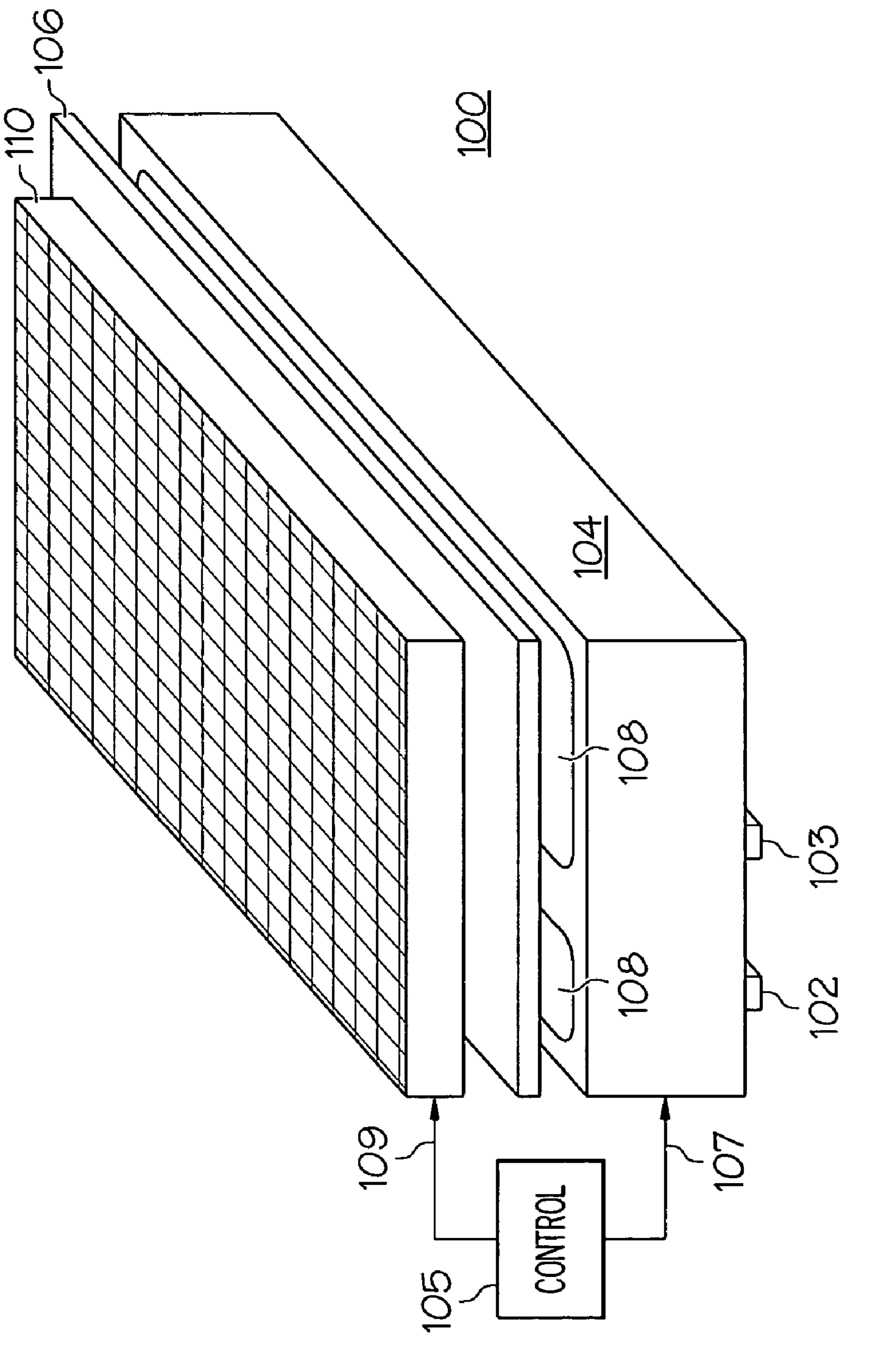
FIG. 1 is an exploded perspective view of an exemplary flat panel display.

Turning now to the drawing figures and with initial reference to FIG. 1, an exemplary flat panel display 100 suitably includes a backlight assembly with a substrate 104 and a faceplate 106 confining appropriate materials for producing visible light within one or more channels 108. Typically, materials present within channel(s) 108 include argon (or another relatively inert gas), mercury and/or the like. To operate the lamp, an electrical potential is created across the channel 108 (e.g. by coupling electrodes 102, 103 to suitable voltage sources and/or driver circuitry), the gaseous mercury is excited to a higher energy state, resulting in the release of a photon that typically has a wavelength in the ultraviolet light range. This ultraviolet light, in turn, provides "pump" energy to phosphor compounds and/or other light-emitting materials located in the channel to produce light in the visible spectrum that propagates outwardly through faceplate 106 toward pixel array 110.

The light that is produced by backlight assembly 104/106 is appropriately blocked or passed through each of the various pixels of array 110 to produce desired imagery on the display 100. Conventionally, display 100 includes two polarizing plates or films, each located on opposite sides of pixel array 110, with axes of polarization that are twisted at an angle of approximately ninety degrees from each other. As light passes from the backlight through the first polarization layer, it takes on a polarization that would ordinarily be blocked by the opposing film. Each liquid crystal, however, is capable of adjusting the polarization of the light passing through the pixel in response to an applied electrical potential. By controlling the electrical voltages applied to each pixel, then, the polarization of the light passing through the pixel can be "twisted" to align with the second polarization layer, thereby allowing for control over the amounts and locations of light passing from backlight assembly 104/106 through pixel array 110. Most displays 100 incorporate control electronics 105 to activate, deactivate and/or adjust the electrical parameters 109 applied to each pixel. Control electronics 105 may also provide control signals 107 to activate, deactivate or otherwise control the backlight of the display. The backlight may be controlled, for example, by a switched connection between electrodes 102, 103 and appropriate power sources. While the particular operating scheme and layout shown in FIG. 1 may be modified significantly in some embodiments, the basic principals of fluorescent backlighting are applied in many types of flat panel displays 100, including those suitable for use in avionics, desktop or portable computing, audio/video entertainment and/or many other applications.

Fluorescent lamp assembly 104/106 may be formed from any suitable materials and may be assembled in any manner. Substrate 104, for example, is any material capable of at least partially confining the light-producing materials present within channel 108. In various embodiments, substrate 104 is formed from ceramic, plastic, glass and/or the like. The general shape of substrate 104 may be fashioned using conventional techniques, including sawing, routing, molding and/or the like. Further, and as described more fully below, channel 108 may be formed and/or refined within substrate 104 by sandblasting in some embodiments.

Channel 108 is any cavity, indentation or other space formed within or around substrate 104 that allows for partial or entire confinement of light-producing materials. In various embodiments, lamp assembly 104/108 may be fashioned with any number of channels, each of which may be laid out in any manner. Serpentine patterns, for example, have been widely adopted to maximize the surface area of substrate 104 used to produce useful light. U.S. Pat. No. 6,876,139, for example, provides several examples of relatively complicated serpentine patterns for channel 108, although other patterns that are more or less elaborate could be adopted in many alternate embodiments.

Channel 108 is appropriately formed in substrate 104 by milling, molding or the like, and light-emitting material is applied though spraying or any other conventional technique. Light-emitting material found within channel 108 is typically a phosphorescent compound capable of producing visible light in response to "pump" energy (e.g. ultraviolet light) emitted by vaporous materials confined within channel 108. Various phosphors used in fluorescent lamps include any presently known or subsequently developed light-emitting materials, which may be individually or collectively employed in a wide array of alternate embodiments. Light emitting materials may be applied or otherwise formed in channel 108 using any technique, such as conventional spraying or the like. In various embodiments, an optional protective layer may be provided to prevent argon, mercury or other vapor molecules from diffusing into the light-emitting material. When used, such a protective layer may be made up of any conventional coating material such as aluminum oxide or the like. Alternatively, various embodiments could include a protective layer that includes fused silica ("quartz glass") or a similar material to prevent mercury penetration.

Cover 106 is typically made of glass, ceramic glass or plastic, and is suitably attached to substrate 104 by glass fritting or the like in a manner that seals the vaporous materials within channel 108.

Figure 2:
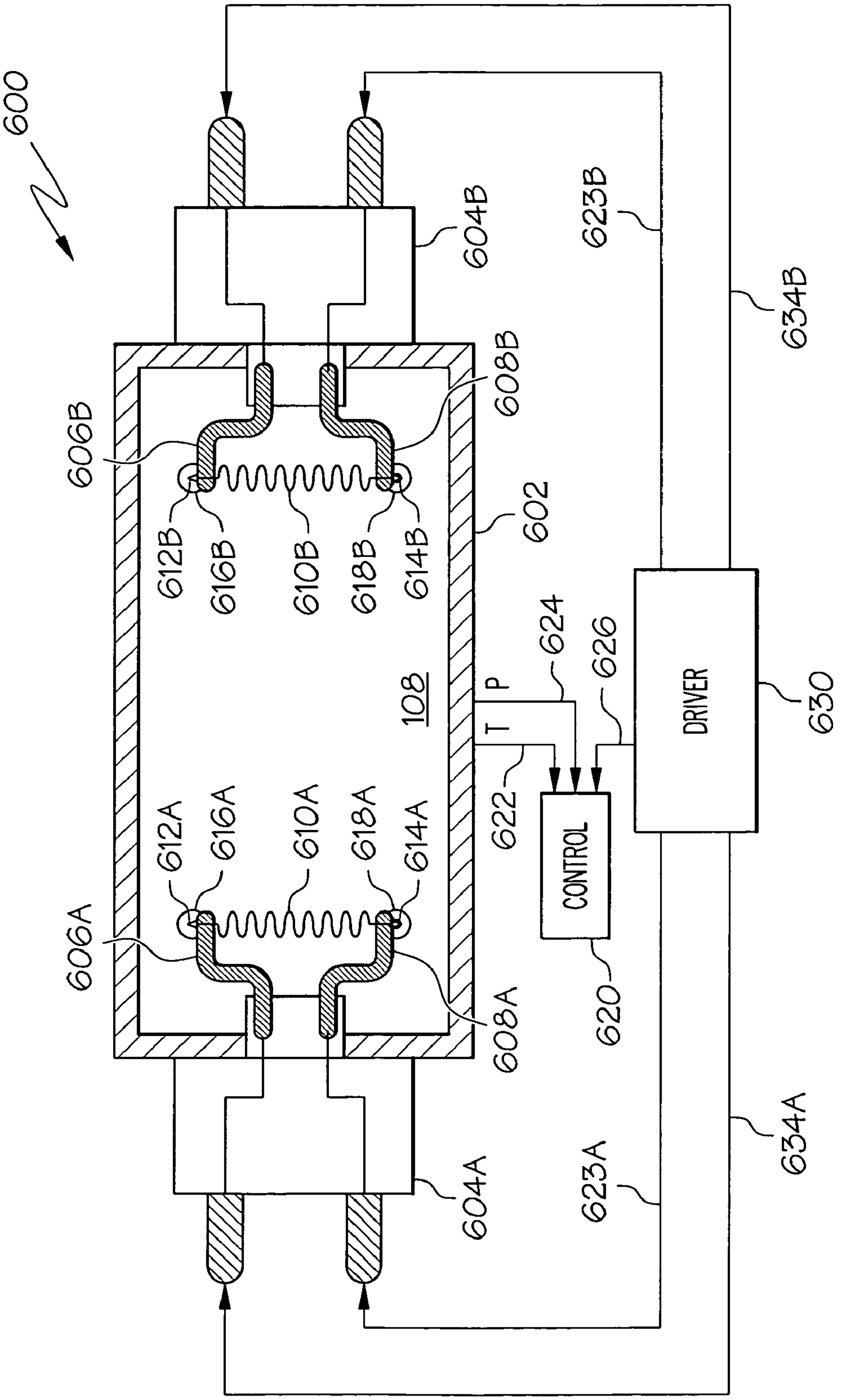
FIG. 2 is a block diagram that shows additional detail of an exemplary fluorescent bulb and the control electronics of an exemplary fluorescent lamp.

Turning now to FIG. 2, an exemplary light source system 600 suitably includes a fluorescent lamp 602, a driver circuit 630, and optional control circuitry 620. In various embodiments, control circuitry 620 senses and/or controls the temperature, pressure and/or other characteristics of lamp 602, and further provides one or more control signals 626 to driver circuit 630 to produce desired operation of system 600. Driver circuit 630 is typically implemented using any conventional analog and/or digital circuitry to apply any number of control signals 623A-B, 634A-B to produce light in lamp 602. In various embodiments, driver circuit 630 and control circuitry 620 are incorporated within a single device or circuit, and may be further combined with control electronics 105 for display 100 as described above.

Lamp 602 is any bulb or other light source capable of producing fluorescent light resulting from electrical excitation of vaporous materials residing within channel 108, as described above. In various embodiments, lamp 602 suitably includes two or more electrode assemblies 604A-B that provide an interface between external sources of electrical energy and the gas or plasma residing within channel 108. In a conventional implementation, electrode assemblies 604A-B each include two or more electrodes 612A-B, 614A-B interconnected by one or more filaments 610A-B. In the exemplary embodiment of FIG. 2, for example, one assembly 604A includes two electrodes 606A and 608A interconnected by filament 610A, and the other assembly 604B includes electrodes 606A and 608B interconnected by filament 610B. Driver circuit 630 provides appropriate electrical signals 623 A-B, 634A-B that can be applied to electrodes 606A-B, 608A-B (respectively) to produce light. In a conventional embodiment, an alternating current is applied across each filament 610A-B, while a voltage difference is applied across channel 108 (e.g. a difference in charge is created between filament 610 and filament 610B) to allow electrons to migrate across the charged plasma within channel 108 from one end to the other. Signals 623A-B and 634A-B may be generated and applied in any manner to implement a wide array of equivalent operating techniques.

Figure 3:
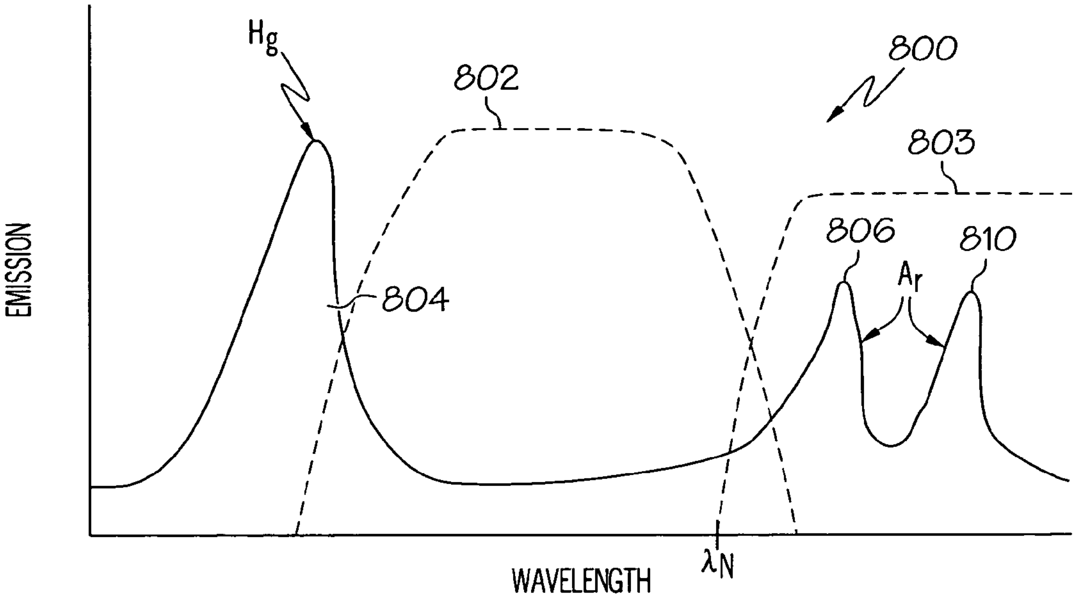
FIG. 3 is a plot of an exemplary spectral emission for an exemplary vaporous material present within a fluorescent lamp cavity.

Various techniques of operating control electronics 620 and/or driver circuitry 630 can further improve the performance of lamp 602. By providing suitable drive signals 623, 634 to the lamp, for example, light output can frequently be improved, often with a decrease in applied drive power. Referring now to FIG. 3, a simplified emission spectral plot 800 for an exemplary plasma residing within a light source channel 108 suitably exhibits peak emissions at various wavelengths. Peak 804 (which may be centered around a wavelength of approximately 285 nm or so), for example, reflects the presence of mercury (Hg) within the plasma, and peaks 806 and 810 (which may be centered around wavelengths of approximately 810 and 840 nm, respectively) reflects the presence of argon. Generally speaking, it is desirable to maximize emissions in the ultraviolet range (shown by region 802 in FIG. 3) to create a higher level of UV "pump" radiation in channel 108 that, in turn, causes phosphor or other light-emitting material in channel 108 to produce visible light (e.g. light within region 802) for the display. The mercury emissions that are maximized along peak 804, for example, lie within the desired wavelength range for such emissions. It is therefore desirable in many embodiments to maximize mercury emissions 804 (and/or other emissions with similar wavelengths) to increase the amount of beneficial UV radiation produced by the plasma.

Conversely, the emissions peaks 806, 810 typically associated with argon lie outside the useful range of radiated emission. Not only are such emissions incapable of providing adequate "pump" radiation to phosphors or other light emitting materials within channel 108, but such emissions can actually interfere with operation of infra-red sensitive equipment used in close proximity to the display. In particular, emissions at relatively high wavelengths (e.g. above 750 nm or so) can be highly undesirable in certain displays, particularly those relating to night vision (NVIS) applications. Such infra-red sensitive equipment typically includes automatic gain control (AGC) circuitry that amplifies radiation with wavelengths higher than the visible range (e.g. infrared radiation), as indicated by region 803 in FIG. 3. Emissions produced in range 803 by the display itself can therefore significantly degrade NVIS performance. As a result, many NVIS and other displays currently incorporate expensive filtering to remove such emissions above a particular wavelength (shown as $\lambda_N$ in FIG. 2). By removing the source of emissions lying within region 803, however, the need for such filtering is significantly reduced and/or eliminated.

Figure 4:
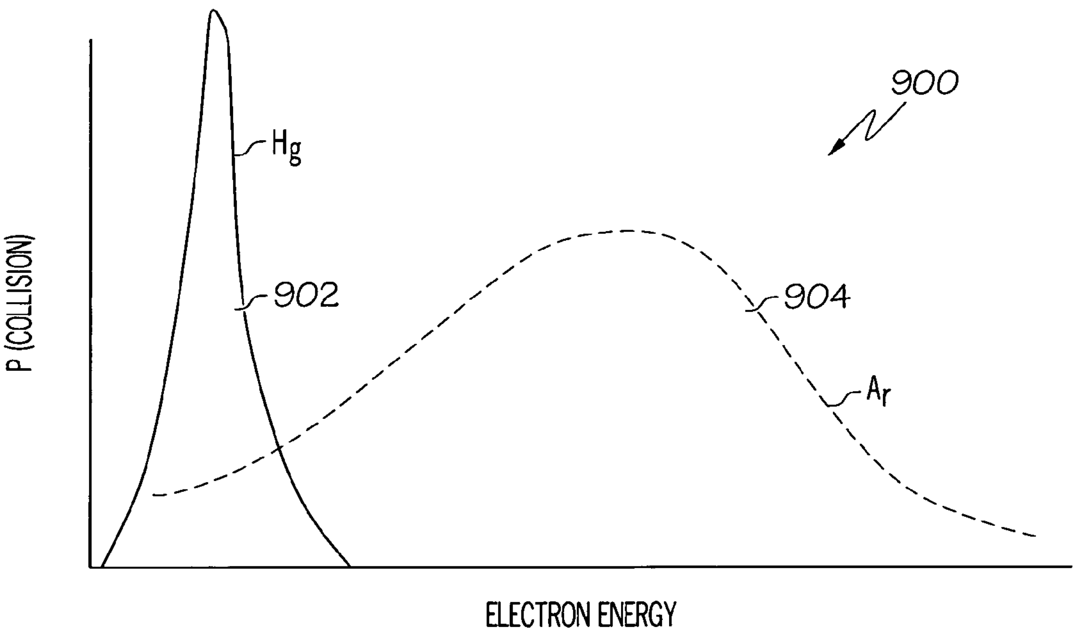
FIG. 4 is a plot showing exemplary collision probabilities for various electron energies.

FIG. 4 shows an exemplary plot 900 of the collision probabilities for mercury (curve 902) and for argon (curve 904) as functions of applied electron energy. In practice, most conventional displays simply maximize the amount of electrical power used to drive lamp 602, resulting in operation toward the rightward edge of FIG. 4. As can be appreciated from FIG. 4, operation at relatively high electron energies (corresponding to a relatively high applied potential between the ends of lamp 602) tends to increase undesirable argon collisions 904 while reducing beneficial mercury collisions 902.

To improve efficiency and reduce the amount of undesired emissions, control circuitry 620 can be used to maintain the voltage produced by driver circuit 630 at a level that increases such beneficial mercury emissions while avoiding detrimental argon emissions. Stated another way, control circuitry 620 maintains the voltage across lamp 602 in such a way that produces electron energies in the range of curve 902 in FIG. 4 rather than in the right-hand portion of curve 904. By optimizing the voltage of pulses applied across lamp 602, the amount of beneficial UV light produced is increased while the amount of undesired infrared or near-infrared emissions can be significantly decreased (e.g. often by an order of magnitude or more). Exemplary embodiments therefore drive the plasma using pulses or other electrical signals 623, 634 in a manner that gives mean electron energies that maximize probabilities of collisions with particles that produce light in the ultraviolet range, rather than in the infrared/NVIS range 803 (FIG. 3)

Because peak 902 for mercury emission is relatively narrow compared with the curve 904 representing argon emissions, however, it may be desirable in certain embodiments to carefully control not only the voltages and/or currents applied to each electrode (e.g. with signals 623A-B and 634A-B), but also to either monitor or control the pressure and/or temperature of lamp 602 as appropriate. That is, the operating characteristics of lamp 602 typically change with respect to temperature and pressure. To respond to fluctuations in conditions while maintaining operation within the limits of curve 902, it may be desirable in some embodiments to sense the temperature 622 and pressure 624 using any type of suitable sensors and to correspondingly adjust the electrical signals 623A-B, 634A-B using any algorithm, lookup table and/or other technique. Alternatively, temperature 622 and/or pressure 624 may be controlled (using, e.g., a thermoelectric heater or the like) by control electronics 620 using any conventional techniques.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims and their legal equivalents.

What is claimed is:

1. A fluorescent light source for providing a visible light, the light source comprising:

- a light-producing channel configured to confine a vaporous material that produces an ultra-violet light when electrically excited;
- a light-emitting material disposed within at least a portion of the channel that is responsive to the ultra-violet light to produce the visible light;
- a first and a second electrode assembly disposed within the channel and configured to apply an electrical potential across at least a portion of the channel;
- a temperature sensor configured to provide a temperature input to a control circuitry; and
- control circuitry configured to provide thermally compensated control signals based at least on the temperature input to the first and second electrode assemblies to apply the electrical potential in a manner that produces a mean electron energy that produces a significantly higher probability of collisions between electrons and particles that produce light in the ultraviolet range and that decreases, by an order of magnitude or more, a probability of collisions between electrons and particles that produce light in the infrared range.

2. The light source of claim 1 wherein the vaporous material comprises mercury.

3. The light source of claim 2 wherein the vaporous material further comprises argon.

4. The light source of claim 3 wherein the control circuitry is further configured to produce more emissions having wavelengths less than 400 nm than emissions having wavelengths greater than 750 nm.

5. The light source of claim 1 wherein the control circuitry is further configured to produce more emissions having wavelengths less than 400 nm than emissions having wavelengths greater than 750 nm.

6. A fluorescent light source for providing a visible light, the light source comprising:

- a light-producing channel configured confine a vaporous material comprising argon and mercury that produces an ultra-violet light when electrically excited, wherein the light-producing channel further comprises a light-emitting material disposed within at least a portion of the channel that is responsive to the ultra-violet light to produce the visible light;

a first and a second electrode assembly disposed within the channel and configured to apply an electrical potential across at least a portion of the channel;

a temperature sensor configured to provide a temperature input to a control circuitry; and control circuitry configured to provide thermally compensated control signals based at least on the temperature input to the first and second electrode assemblies to apply the electrical potential in a manner that produces a mean electron energy that produces a significantly higher probability of collisions between electrons and particles that produce light in the ultraviolet range and that decreases, by an order of magnitude or more, a probability of collisions between electrons and particles that produce light in the infrared range.

7. The fluorescent light source of claim 6 wherein the control circuitry is further configured to apply the electrical potential in a manner that produce more emissions in the light-producing channel having wavelengths less than 400 nm than emissions having wavelengths greater than 750 nm.

8. The fluorescent light source of claim 6 further comprising a pressure sensor in communication with the control circuitry.

9. A method of controlling a fluorescent light source having a first electrode and a second electrode disposed within a light-emitting channel, the method comprising the steps of:

sensing a temperature within the fluorescent light source by a temperature sensor;

providing a thermally compensated first control signal to the first electrode based in part on the sensed temperature;

providing a thermally compensated second control signal to the second electrode based in part on the sensed temperature; and adjusting at least one of the thermally compensated first and second control signals to maintain an electric potential across the first and second electrodes in a manner that produces a mean electron energy that substantially maximizes probabilities of collisions between electrons and particles that produce a significantly higher probability of collisions between electrons and particles that produce light in the ultraviolet range and that decreases, by an order of magnitude or more, a probability of collisions between electrons and particles that produce light in the infrared range.

10. The method of claim 9 wherein the adjusting step further comprises applying the electrical potential in a manner that produces more emissions in the light-producing channel having wavelengths substantially less than 400 nm than emissions having wavelengths greater than 750 nm.

11. Control circuitry for a light source configured to execute the method of claim 9.

12. A light source operated in accordance with the method of claim 9.

13. The fluorescent light source of claim 1, wherein the control circuitry is further configured to provide the thermally compensated control signals to the first and second electrodes in a manner that produces and maintains a mean electron energy that maximizes probabilities of collisions with particles producing light in the ultraviolet range.

14. The light source of claim 13 wherein the control circuitry is further configured to adjust the thermally compensated control signals in response to changes in temperature to maintain the electrical potential at the level that produces the mean electron energy that maximizes probabilities of collisions with particles producing light in the ultraviolet range.

15. The light source of claim 13 wherein the control circuitry is further configured to adjust the thermally compensated control signals in response to changes in environmental pressure to maintain the electrical potential at the level that produces the mean electron energy that maximizes probabilities of collisions with particles producing light in the ultraviolet range.

16. The light source of claim 13 wherein the control circuitry is further configured to adjust the temperature of the channel to maintain the electrical potential at the level that produces the mean electron energy that maximizes probabilities of collisions with particles producing light in the ultraviolet range.

17. The light source of claim 16 wherein the control circuitry is coupled to a thermoelectric heater and wherein the control circuitry is further configured to maintain the temperature of the channel using the thermoelectric heater.

18. The fluorescent light source of claim 13 wherein the control signals are pulsed signals.

* * * * *